US008887135B2

(12) United States Patent
Banerjee et al.

(10) Patent No.: US 8,887,135 B2
(45) Date of Patent: Nov. 11, 2014

(54) GENERATING TEST CASES FOR FUNCTIONAL TESTING OF A SOFTWARE APPLICATION

(75) Inventors: Udayan Banerjee, Bangalore (IN); Eswaran Narasimhan, Bangalore (IN)

(73) Assignee: NIIT Technologies Ltd, New Delhi (IN)

( * ) Notice: Subject to any disclaimer, the term of this patent is extended or adjusted under 35 U.S.C. 154(b) by 286 days.

(21) Appl. No.: 13/434,882

(22) Filed: Mar. 30, 2012

(65) Prior Publication Data

US 2013/0263089 A1 Oct. 3, 2013

(51) Int. Cl.
*G06F 9/44* (2006.01)

(52) U.S. Cl.
USPC .......................................... 717/124; 717/106

(58) Field of Classification Search
None
See application file for complete search history.

(56) References Cited

U.S. PATENT DOCUMENTS

| | | | |
|---|---|---|---|
| 5,600,789 A | 2/1997 | Parker et al. | |
| 5,754,755 A * | 5/1998 | Smith, Jr. ..................... | 714/38.1 |
| 6,002,869 A | 12/1999 | Hinckley | |
| 7,139,955 B2 | 11/2006 | Rohrbaugh et al. | |
| 7,437,614 B2 | 10/2008 | Haswell et al. | |
| 7,707,553 B2 * | 4/2010 | Roques et al. ................ | 717/124 |
| 7,818,328 B2 | 10/2010 | Bottger et al. | |
| 7,900,089 B2 | 3/2011 | Hayutin et al. | |
| 7,917,895 B2 | 3/2011 | Givoni et al. | |
| 7,937,622 B2 | 5/2011 | Mehrotra | |
| 8,381,197 B2 * | 2/2013 | Meenakshisundaram et al. ............................ | 717/135 |
| 2003/0009709 A1 * | 1/2003 | Belenger et al. ................ | 714/37 |
| 2003/0055836 A1 | 3/2003 | Dubovsky | |
| 2004/0025083 A1 * | 2/2004 | Nanja et al. ...................... | 714/35 |
| 2006/0265691 A1 * | 11/2006 | Klinger et al. ................ | 717/124 |
| 2008/0263526 A1 * | 10/2008 | Urra et al. ...................... | 717/136 |
| 2009/0018811 A1 * | 1/2009 | Paradkar et al. ................ | 703/22 |
| 2009/0292956 A1 | 11/2009 | Rivera et al. | |
| 2011/0088014 A1 * | 4/2011 | Becker et al. ................ | 717/125 |
| 2011/0123973 A1 * | 5/2011 | Singh ............................ | 434/322 |
| 2012/0198280 A1 * | 8/2012 | Cao et al. ........................ | 714/32 |
| 2012/0272206 A1 * | 10/2012 | Sengupta et al. ............. | 717/101 |
| 2013/0097586 A1 * | 4/2013 | Chandra et al. ............... | 717/124 |
| 2014/0052747 A1 * | 2/2014 | Chavvakula et al. ......... | 707/758 |
| 2014/0089895 A1 * | 3/2014 | Clee et al. ..................... | 717/121 |

OTHER PUBLICATIONS

Authors et. al: Disclosed Anonymously, "A Method and Apparatus to interactive transfer restrictednatural language oriented test case to test script", IP.com No. IPCOM000206523D, Apr. 29, 2011.*

(Continued)

*Primary Examiner* — Don Wong
*Assistant Examiner* — Hossain Morshed
(74) *Attorney, Agent, or Firm* — Narendra Reddy Thappeta (57) ABSTRACT

An aspect of the present invention generates test cases for functional testing of a software application. In one embodiment, rules specifying corresponding patterns in a natural language and corresponding templates are maintained. Each pattern contains corresponding variables and words of the natural language together in an ordered sequence. On receiving a design document containing statements in the natural language, a first statement is determined to match a first pattern specified in a first rule. A match is deemed to exist only if the words in the first pattern exist in the first statement in the same corresponding positions of the ordered sequence, and if the first statement also contains values for each of the variables specified in the first pattern. A set of test cases is generated based on a first template specified in the first rule and the values for each of the variables.

15 Claims, 6 Drawing Sheets

(56) References Cited

OTHER PUBLICATIONS

Barrett R. Bryant, "Object-Oriented Natural Language Requirements Specification", Proceedings of ACSC 2000, the 23rd Australasian Computer Science Conference Canberra, Australia, pp. 1-7.

S.J. Cunning, J.W. and Rozenblit, "Test Scenario Generation From a Structured Requirements Specification", Dated: Mar. 7, 2012, pp. 1-7.

Aynur Abdurazik and Jeff Offutt, "Using UML Collaboration Diagrams for Static Checking and Test Generation", The Third International Conference on the Unified Modeling Language (UML'00), pp. 383-395, York, UK, Oct. 2000.

Matthias Schnelte, "Generating Test Cases for Timed Systems From Controlled Natural Language Specifications", Dated: Jul. 8, 2009, pp. 348-353.

* cited by examiner

Rule: — 310
$1 must exist in $2

Template:
Test Case 1: — 330
1. Open $2
2. Look up one instance of $1 – say S1 in $2
3. Close $2
4. Enter S1 in the $1 text box
5. Submit
*Expected Result:*
The $1 page entry screen in displayed.

Test Case 2: — 340
1. Open $2
2. Identify one instance of $1 – say S2 not in $2
3. Close $2
4. Enter S2 in the $1 text box
5. Submit
*Expected Result:*
A $1 not found error message is displayed.

FIG. 3B

Rule: — 350
$3 depends on $4

Template:
Format: — 370
{$a|$b}
[M] Casual, Medical, Vacation}
[F] Casual, Medical, Vacation, Maternity}

Test Case X: — 380
Enter $4 as $a
Set Focus to $3
*Expected Result:*
If $4=$a
$3 List should contain Options: $b

Test Case 1:
Enter Gender as M
Set Focus to Leave Type

*Expected Result:*
Leave Type List should contain Options: Casual, Medical, Vacation

460

Test Case 2:
Enter Gender as F
Set Focus to Leave Type

*Expected Result:*
Leave Type List should contain Options: Casual, Medical, Vacation, Maternity

Example 2

● Male
○ Female

Leave Type
▶
Casual
Medical
Vacation

520

Example 2

○ Male
● Female

Leave Type
▶
Casual
Medical
Vacation

GENERATING TEST CASES FOR FUNCTIONAL TESTING OF A SOFTWARE APPLICATION

BACKGROUND OF THE INVENTION

1. Technical Field

The present disclosure relates to software systems, and more specifically to generating test cases for functional testing of a software application.

2. Related Art

A software application refers to one or more modules, which when executed provides a corresponding functionality (i.e., what is provided). The functionality generally needs to meet corresponding requirements determined typically prior to the development of the software application.

Functional testing of a software application refers to checking whether the software application operates according to the requirements that need to be met. Such checking is performed by providing a set of inputs and determining whether the output of the software application for the provided inputs matches expected results (determined based on requirements). Each combination of inputs, which causes a corresponding output to be generated for checking, is referred to as a test case.

It is generally required that a comprehensive set of test cases be generated such that any deviations of a software application from corresponding requirements are identified.

BRIEF DESCRIPTION OF THE DRAWINGS

Example embodiments of the present invention will be described with reference to the accompanying drawings briefly described below.

Each of FIGS. 3A and 3B depicts a corresponding rule for matching and generating test cases in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention generates test cases for functional testing of a software application. In one embodiment, a set of rules is maintained, each rule specifying a corresponding pattern in a natural language and a corresponding template. Each pattern contains a corresponding set of variables and corresponding words of the natural language together in an ordered sequence. On receiving a design document containing statements in the natural language, a first statement is determined to match a first pattern specified in a first rule. A match is deemed to exist only if the words in the first pattern exist in the first statement in the same corresponding positions of the ordered sequence, and if the first statement also contains values for each of the corresponding set of variables specified in the first pattern. A set of test cases is generated based on a first template specified in the first rule and the values for each of the corresponding set of variables.

Several aspects of the present invention are described below with reference to examples for illustration. However, one skilled in the relevant arts will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
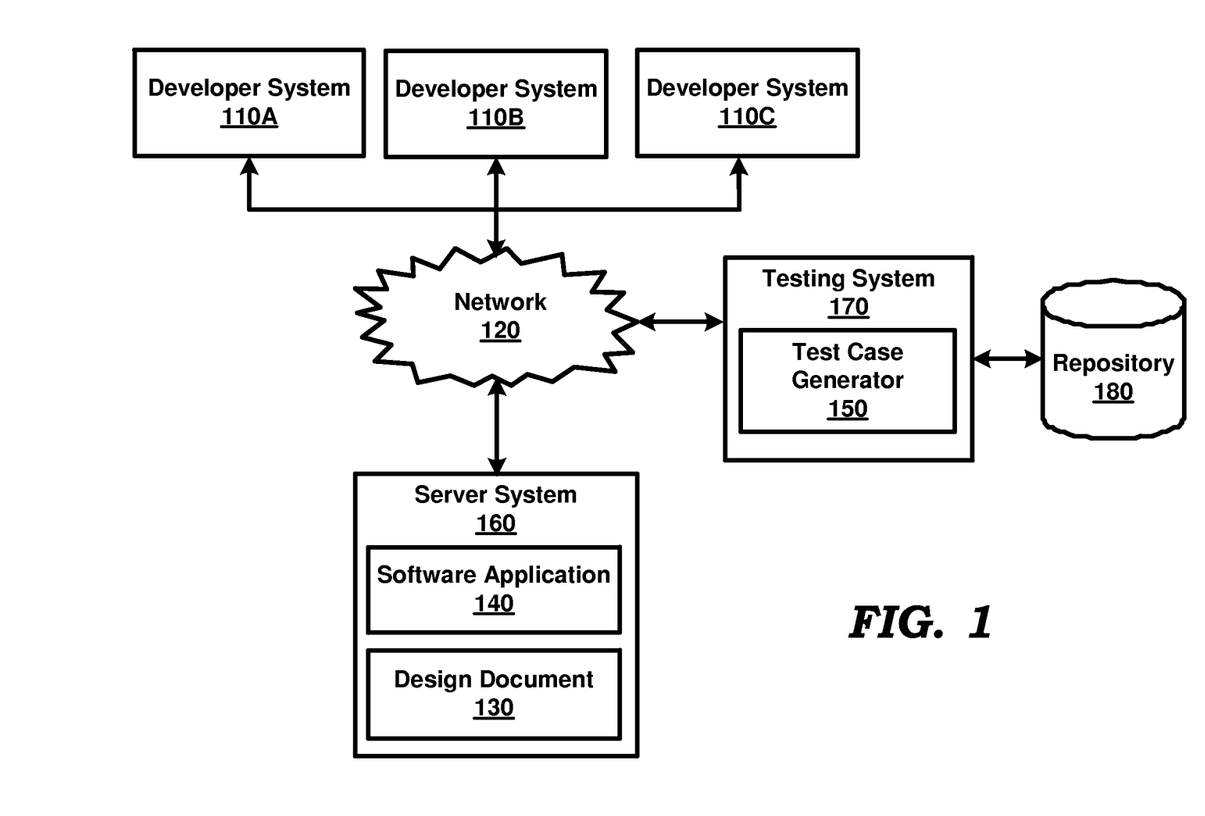
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing developer systems 110A-110C, network 120, server system 160 (shown containing design document 130 and software application 140), testing system 170 (shown containing test case generator 150) and repository 180.

Merely for illustration, only representative number/type of systems is shown in FIG. 1. Many environments often contain many more systems, both in number and type, depending on the purpose for which the environment is designed. Each system/device of FIG. 1 is described below in further detail.

Network 120 provides connectivity between developer systems 110A-110C, server system 160 and testing system 170 and may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by network 120. When the packet contains content such as port numbers, which specifies the target application, the packet may be said to be directed to such application as well Repository 180 represents a non-volatile (persistent) storage facilitating storage and retrieval of a collection of data (such as test cases, status of performance of the test cases, etc.) by applications (such as test case generator 150) executing in testing system 170. Repository 180 may be implemented as a corresponding database server using relational database technologies and accordingly provide storage and retrieval of data using structured queries such as SQL (Structured Query Language). Alternatively, repository 180 may be implemented as a corresponding file server providing storage and retrieval of data in the form of files organized as one or more directories, as is well known in the relevant arts.

Server system 160 represents a server, such as a web/application server, executing applications (such as software application 140) capable of performing tasks requested by end users using client systems (not shown in FIG. 1). Each application is designed to provide a corresponding functionality to the end users, based on the corresponding requirements specified for the application.

Each of developer systems 110-110C and testing system 170 represents a system such as a personal computer, workstation, mobile station, etc., used by users (such as developers, testers, etc.) to develop, deploy and test applications (such as software application 140) in server system 160. In particular, developers using developer systems 110A-110C, retrieve the requirements specified in design document 130 and implement one or more modules of software application 140 according to the requirements (such that the functionality provided by software application 140 meets the specified requirements). The implementation may entail adding new modules to and/or modifying/removing some of the existing modules forming software application 140.

Testing system 170 facilitates testers to test the applications (such as software application 140) developed and deployed in server system 160. In particular, testing system 170 facilitates the testers to perform functional testing of the software applications, such as checking whether software application 140 is developed according to the requirements specified in design document 130. In one embodiment, testing system 170 provides a testing software/framework designed to perform test cases maintained in repository 180. The testing framework may facilitate the testers to perform the test cases either manually or in an automated manner.

In automated testing, in response to a tester selecting a test case to be performed, the testing framework is designed to provide the inputs specified in the selected test case to the application, receive the corresponding outputs from the application, compare the received outputs with the expected results indicated in the selected test case and store the status of performance ("success" or "failure" based on whether outputs match or do not match the expected results) of the select test case in repository 180. In manual testing, the testing framework facilitates the tester to perform the above noted actions (provide inputs, receive outputs, compare and store status) manually using the user interfaces provided by the software application/testing framework.

It may be appreciated that a comprehensive set of test cases needs to be generated for testing a software application (140) against the corresponding requirements (130). In one prior approach, users (such as system analysts designing the software applications) are necessitated to specify the requirements (130) according to a formal language such as UML (Unified Modeling Language). A set of test cases is then generated based on the requirements in the formal language. Such an approach is burdensome to the users, since the users are forced to learn (and specify the requirements according to) the syntax and semantics of the formal language.

Furthermore, when performing manual and/or functional testing of a software application, it may be desirable and/or sufficient that only test case scenarios be generated. Each test case scenario provides a description of the inputs, outputs and expected results (for example, a table, a database, etc.) for one or more test cases. The test cases may be thereafter generated based on the test case scenario and inputs, outputs, and expected results specific to the implementation of the software application (in the above example, the name of the table/database, the manner of establishing the connection to the database, etc.)

Test case generator 150, provided according to several aspects of the present invention, generates test cases for functional testing of a software application (140) while overcoming some of the drawbacks noted above. Though test case generator 150 is shown executing in testing system 170, in alternative embodiments, test case generator 150 may be implemented as an independent module external to the systems of FIG. 1. The manner in which test case generator 150 generates test cases (and test case scenarios) is described below with examples.

3. Generating Test Case for Functional Testing

Figure 2:
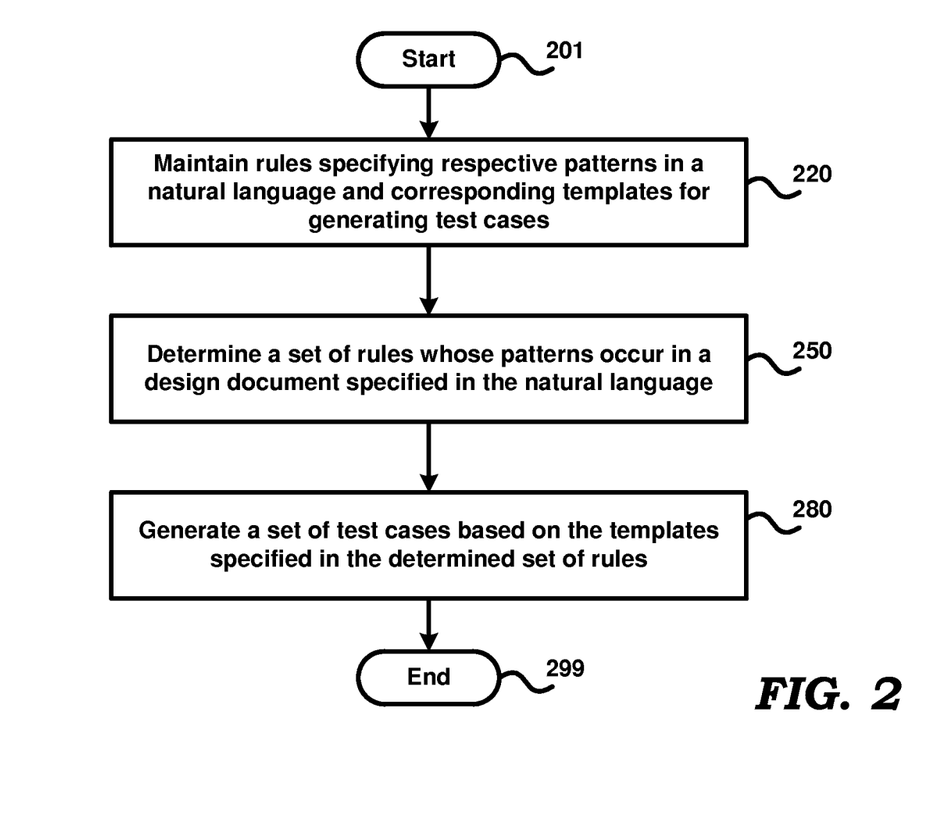
FIG. 2 is a flow chart illustrating the manner in which test cases for functional testing of a software application is generated according to an aspect of the present invention.

FIG. 2 is a flow chart illustrating the manner in which test cases for functional testing of a software application is generated according to an aspect of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, test case generator 150 maintains rules specifying respective patterns in a natural language and a corresponding template for generating one or more test cases. A natural language is a commonly used language (such as English, German, Hindi, etc.) in human communication. The rules may be specified by users (such as business analysts specifying the type of integrity that the data and processes have to follow from a business perspective, designers creating the design document by adapting the same in technical format, testers providing feedback when necessary) using appropriate interfaces, and may be stored in repository 180. The stored rules may be later retrieved for performing the steps 250 and 280.

Each pattern contains a set of variables (which can be associated with values) and corresponding words of the natural language together in an ordered sequence. While the words in the pattern represent the exact string of characters that needs to be present, each variable represents a place holder that can be matched to one or more words (the value associated with the variable). The ordered sequence indicates a relative position (also referred to as the ordinal position) of each of the variables and the words in the pattern. An example pattern is "$1 A B $2" where $1 and $2 are variables, A and B are words in the natural language and the relative positions of $1, A, B and $2 are 1, 2, 3 and 4.

Thus, the rules operate to specify a sub-set of constructs permitted in specifying the requirements, thereby simplifying the processing logic required for generating test cases from the rules.

In step 250, test case generator 150 determines a set of rules whose patterns occur in a design document specified in the natural language. The design document (130) may be received from a server system (160). The design document contains multiple statements, each statement containing one or more words of the natural language. Test case generator 150 accordingly determines whether each statement matches any of the patterns specified in the maintained rules.

A statement is determined to be matching a pattern if the words in the pattern occur in the same relative/ordinal position of the ordered sequence in the statement, and each of the variables in the pattern can be associated with a corresponding value (one or more words) in the statement. In other words, a match is deemed to not exist, if any of the words in the pattern occurs at a different relative/ordinal position in the statement.

Thus, the above noted example pattern "$1 A B $2" is deemed to match statements such as "C A B E" or "C D A B E" (where C, D and E are words in the natural language), with $1 having the respective values "C" and "C D", and $2 having the value "E", since the relative position of A and B are 2, 3 for both statements. However, the pattern is deemed to not match statements such as "C D B A E" or "C A D B E", since the relative positions of A and B (even after matching the variable with corresponding values) are 3, 2 and 2, 4 respectively, and not 2, 3 as specified in the pattern.

Test case generator 150 may similarly identify the other patterns occurring in the design document (130) based on matching the patterns in the rules with each of the statements in the design document, and identify the rules specifying the occurring patterns as the determined set of rules.

In step 280, test case generator 150 generates a set of test cases (or test case scenarios) based on the templates specified in the determined set of rules. In general, each template contains a corresponding text (for generating one or more test cases) embedded with the variables specified in the patterns. The values associated with the variables (determined during the matching of the patterns in step 250) are substituted in place of the embedded variables in the template to generate corresponding test cases. The flow chart ends in step 299.

Thus, by facilitating users/analysts to specify the requirements in a natural language, the burden on the users (to learn a formal language) is considerably reduced, in particular when a manual and/or functional testing of a software application is to be performed. The manner in which test case generator 150 generates test cases according to the steps of FIG. 2 is described below with examples.

4. Illustrative Example

FIGS. 3A-3B, 4A-4C, and 5 together illustrate the manner in which test cases for functional testing of software application (140) are generated in one embodiment. Each of the Figures is described in detail below.

The description is continued assuming that the natural language used for specifying the requirement in the design document is English language. However, the features of the present invention may be applied to other natural languages as well, as will be apparent to one skilled in the relevant arts by reading the disclosure herein.

Figure 3A:
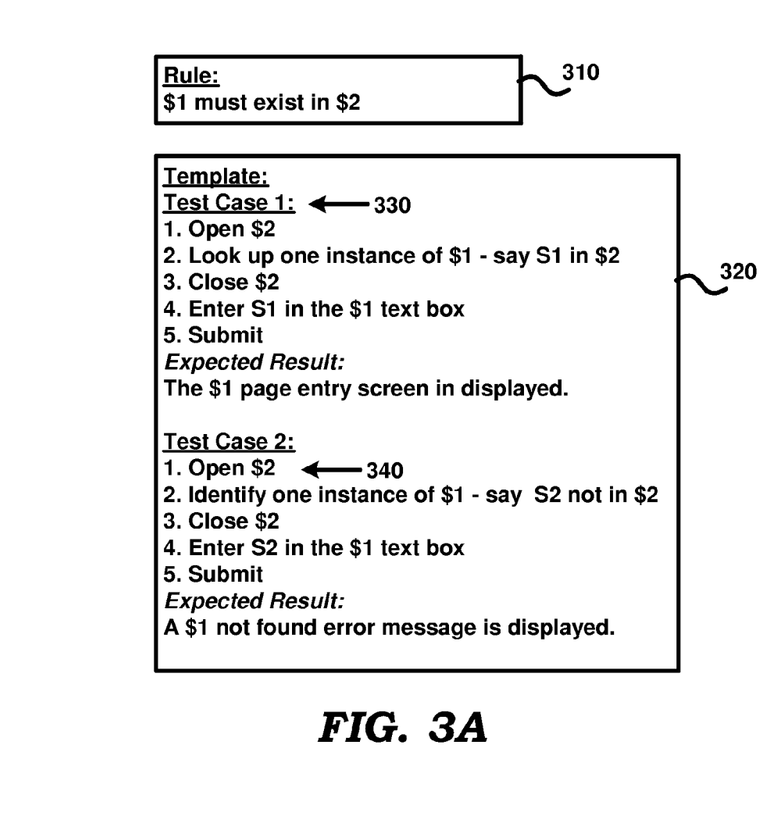
Figure 3B:
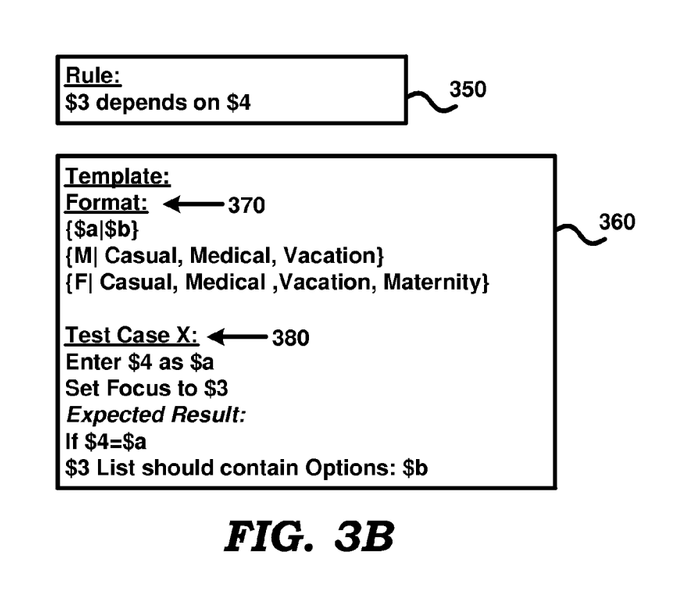

Each of FIGS. 3A and 3B depicts a corresponding rule for matching and generating test cases in one embodiment. The rules may be stored in repository 180, and later retrieved for performing the steps of determining the matching rules/patterns and generating the test cases. Though the rules are shown as being specified as text, in alternative embodiments, the rules may be specified in other formats such as eXtensible Markup Language (XML), etc., as will be apparent to one skilled in the arts by reading the disclosure herein. Each of the rules is described in detail below.

Referring to FIG. 3A, data portion 310 specifies the corresponding pattern "$1 must exist in $2" to be matched, where $1 and $2 are variables and "must", "exist" and "in" are word in the English language. Data portion 320 specifies the corresponding template, with data portions 330 and 340 indicating that the template is designed to generate two corresponding test cases. It may be observed that template 320 is embedded with multiple instances of the variables $1 and $2. Furthermore, each test case specifies a series of steps to be performed for providing the inputs and the expected result to be used for comparison (with the output of the application).

Referring to FIG. 3B, data portion 350 specifies the corresponding pattern "$1 depends on $2", where $3 and $4 are variables and "depends" and "on" are words in the English language, while data portion 360 specifies the corresponding template. Data portion 370 ("Format") specifies a set of "local" variables $a and $b that take the values specified in the next two lines (with $a taking the values before the bar "|" and $b taking the corresponding values after the bar "|"), and not the values based on matching. The multiple values (two in this example) specified for the local variables indicate that multiple (two) test cases corresponding to the different specified values are to be generated. Data portion 380 accordingly includes an "X" instead of a number to indicate that test case number is to be dynamically generated.

A user may similarly specify a desired set of rules using appropriate user interfaces. Test case generator 150 thereafter uses the rules to determine the matching patterns in a design document (130) specified in the natural language, as described below with examples.

Figure 4A:
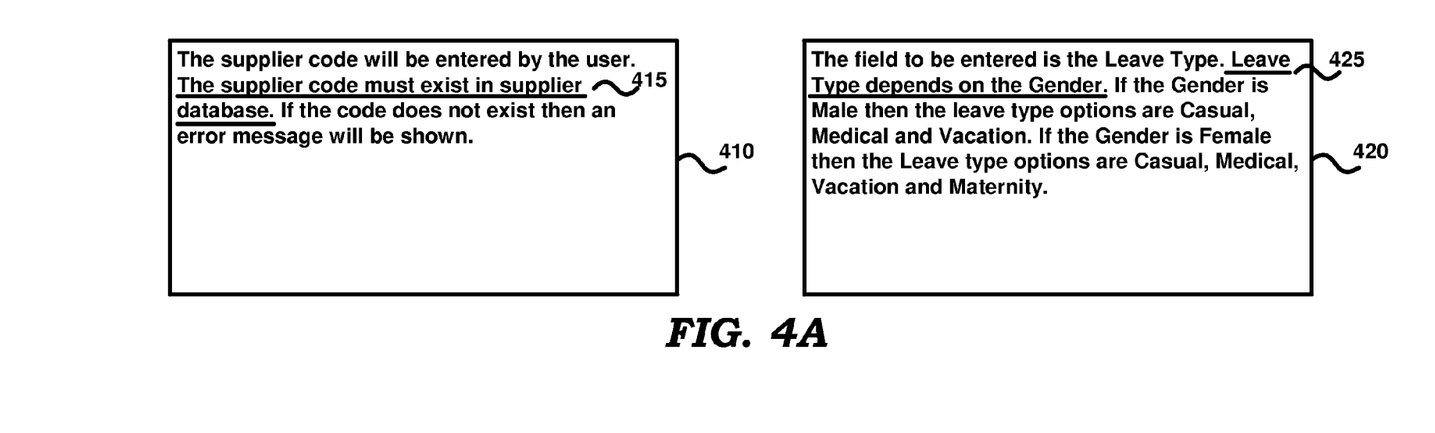
FIG. 4A depicts portions of a design document specified in a natural language in one embodiment.

FIG. 4A depicts portions of a design document (130) specified in a natural language in one embodiment. It may be observed that each of portions 410 and 420 of the design document contains multiple statements specified in the English natural language. Data portion 415 represents a statement that is deemed to be matched with the pattern "$1 must exist in $2" shown in data portion 310, with the variables $1 and $2 respectively taking the values "Supplier Code" and "Supplier Database". Data portion 425 represents another statement that is deemed to match with pattern "$3 depends on $4" shown in data portion 350, with the variables $3 and $4 respectively taking the values "Leave Type" and "Gender".

It may be appreciated that the existence of the matching statements may be determined based on the relative positions of the variables and words in the patterns as noted above with respect to step 250. Test case generator 150 may accordingly generate test cases based on the templates 320 in response to matching statement 415, and based on template 360 in response to matching statement 425. The test cases that may be generated based on templates 320 and 360 are described in detail below.

Figure 4B:
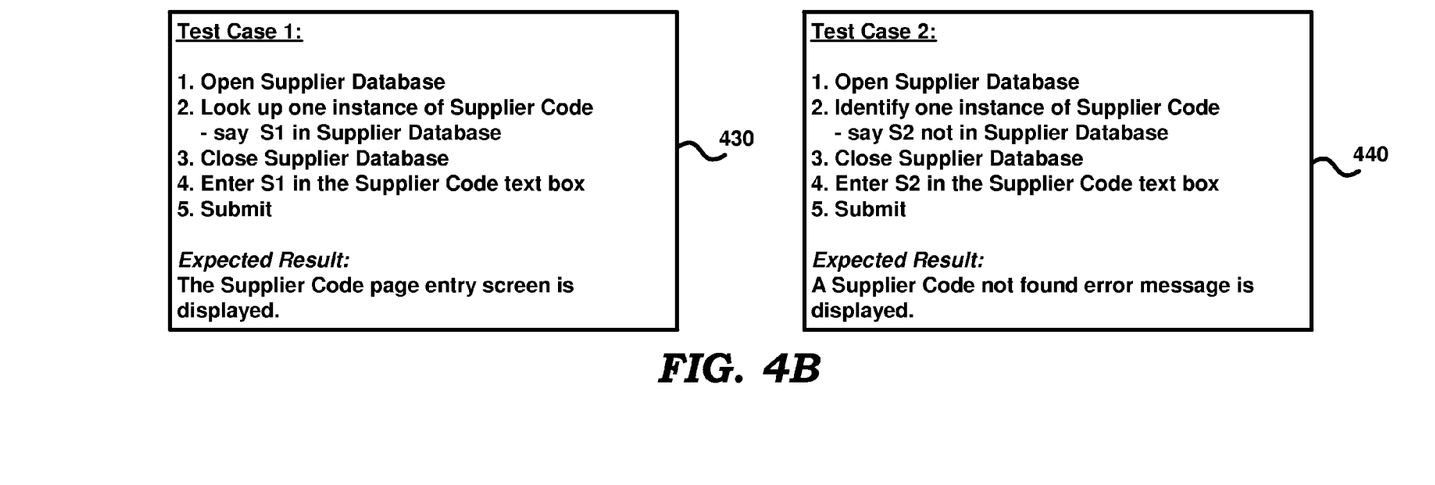
FIGS. 4B and 4C respectively depicts test case scenarios and test cases generated based on templates and matching rules in one embodiment.
Figure 4C:
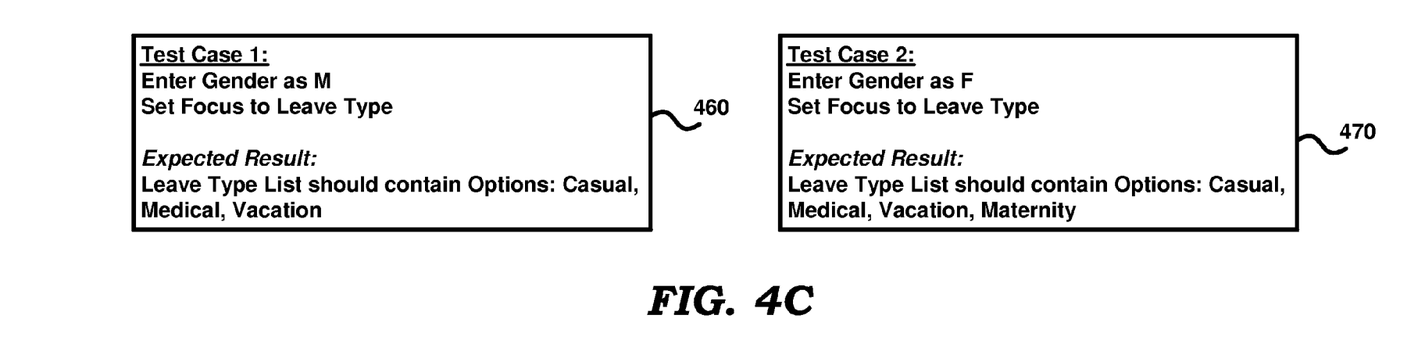

FIGS. 4B and 4C respectively depicts test case scenarios and test cases generated based on templates and matching rules in one embodiment. Referring to FIG. 4B, data portions 430 and 440 represent the test case scenarios generated based on template 320 by substituting the values "Supplier Code" and "Supplier Database" (determined during matching of statement 415) respectively for the multiple instances of the variables $1 and $2 in template 320. It should be noted that the step 2 of each test case scenario (430 and 440) merely specifies the type of supplier code to be identified and later used during testing. A tester may accordingly generate different test cases by identifying the specific values (for example, "SUP_DB" as the table maintaining the supplier database, "1001" and "2209" as being present in the database, and "2210" as not being present in the database) based on the implementation of the software application.

Referring to FIG. 4C, data portions 460 and 470 represent the test cases generated based on template 360 by substituting the values "Leave Type" and "Gender" (determined during matching of statement 425) respectively for the multiple instances of the variables $3 and $4 and also the values for $a and $b in template 360. It should be noted that two test cases are generated corresponding to the two different values specified for $a and $b in template 360. A tester may manually perform the test cases 460 and 470 as described in detail below.

Figure 5:
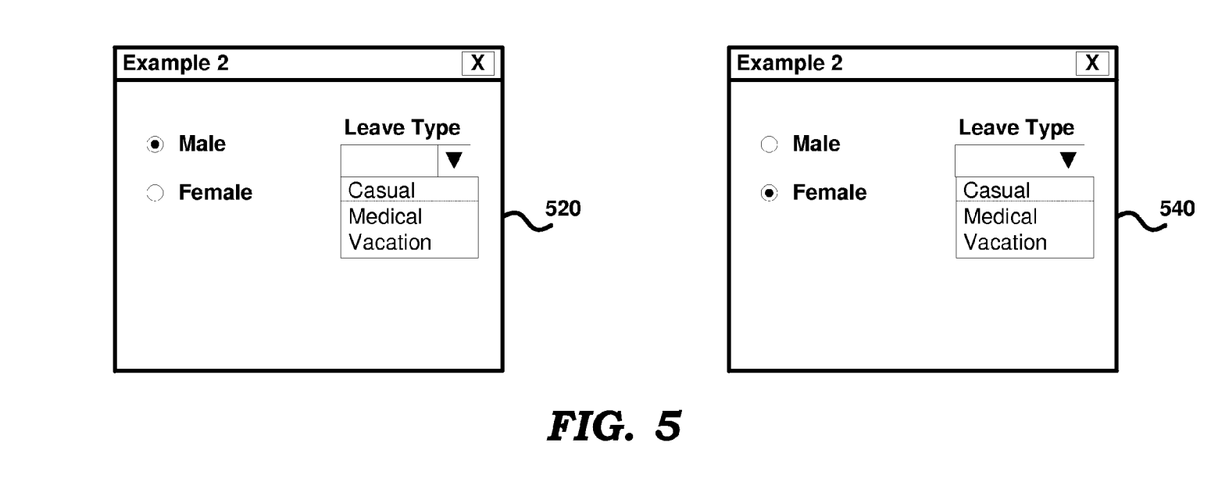
FIG. 5 illustrates the manner in which a tester manually performs functional testing of a software application in one embodiment.

FIG. 5 illustrates the manner in which a tester manually performs functional testing of a software application (140) in one embodiment. Each of display areas 520 and 540 depicts a portion of a user interface provided on a display unit (not shown) associated with testing system 170. The portions of the user interface may be provided by software application 140 in response to requests sent by a tester using testing system 170.

Each of display areas 520 and 540 illustrates the manner in which a corresponding test case (460 and 470) is manually performed. As such, display area 520 indicates that a tester has entered the gender as M (indicated by the selection of the radio button labeled "Male"), and the leave type selection field displays the options {Casual, Medical, Vacation} as the output in response to the inputs. The tester then compares the options displayed with the options indicated in the expected results and may accordingly indicate the status of test case 460 as "success" (since the options are the same).

Display area 540 indicates that the same set of options {Casual, Medical, Vacation} is displayed in the leave type selection field, when the tester has entered the gender as F (indicated by the selection of the radio button labeled "Female") according to test case 470. The tester may accordingly indicate the status of test case 470 as "failure" since the output is different from the expected result (which indicates that the leave type selection field should also display the "Maternity" option).

Thus, a user/tester may manually perform the test cases generated based on the templates and matching rules and check that a software application (140) provides a functionality that meets the specified requirements (in design document 130).

It should be appreciated that the features described above can be implemented in various embodiments as a desired combination of one or more of hardware, executable modules, and firmware. The description is continued with respect to an embodiment in which various features are operative when the software instructions described above are executed.

5. Digital Processing System

Figure 6:
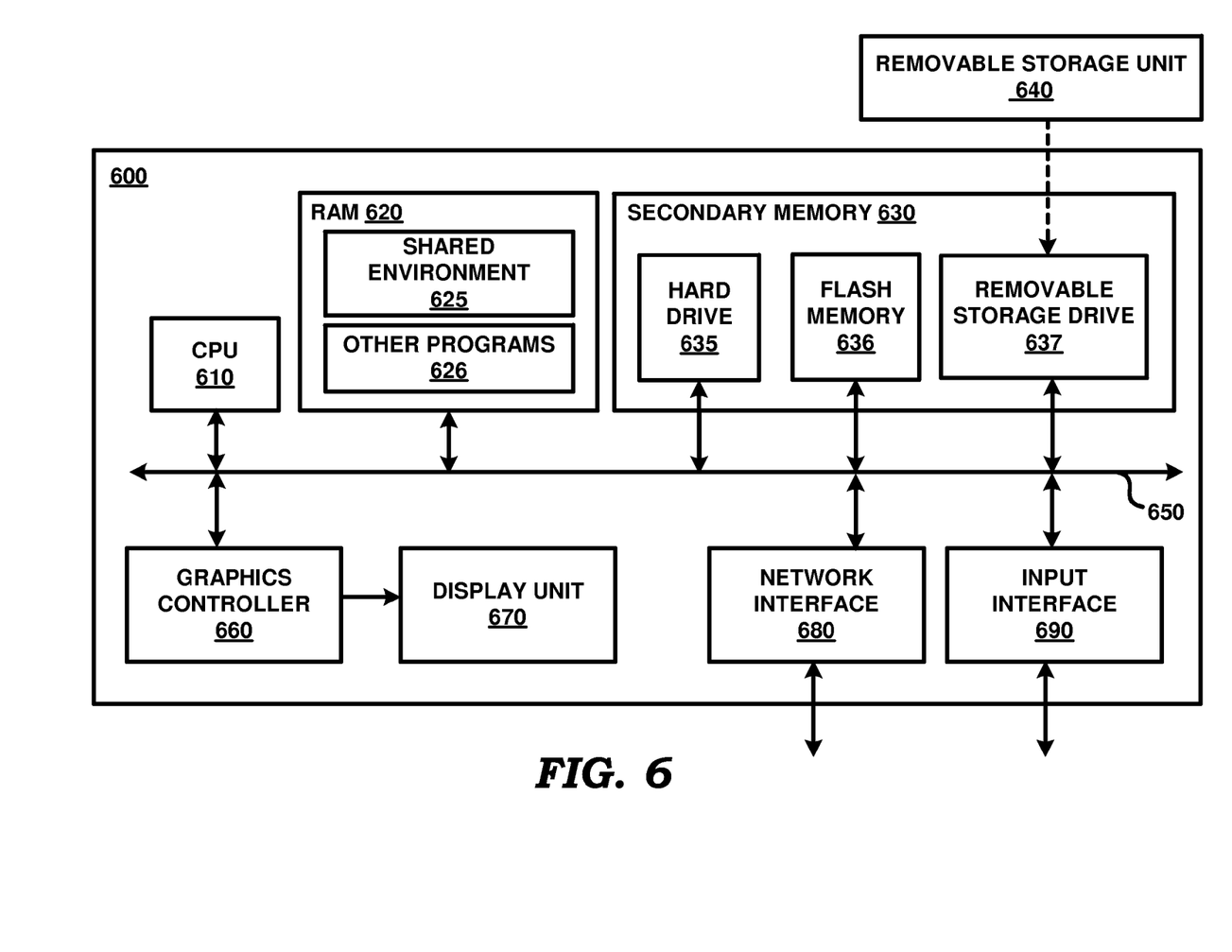
FIG. 6 is a block diagram illustrating the details of digital processing system 600 in which various aspects of the present invention are operative by execution of appropriate software instructions.

FIG. 6 is a block diagram illustrating the details of digital processing system 600 in which various aspects of the present invention are operative by execution of appropriate software instructions. Digital processing system 600 may correspond to any system (such as testing system 170) executing test case generator 150.

Digital processing system 600 may contain one or more processors (such as a central processing unit (CPU) 610), random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions constituting shared environment 625 and/or user programs 626 (such as networking applications, database applications, etc.). Shared environment 625 contains utilities shared by user programs, and such shared utilities include operating system, device drivers, virtual machines, flow engine, etc., which provide a (common) run time environment for execution of user programs/applications.

Graphics controller 660 generates display signals (e.g., in RGB format) to display unit 670 based on data/instructions received from CPU 610. Display unit 670 contains a display screen to display the images defined by the display signals (such as the portions of the user interface shown in FIGS. 5A-5B). Input interface 690 may correspond to a keyboard and a pointing device (e.g., touch-pad, mouse) and may be used to provide the user inputs (such as the inputs specified in the portions of the user interface shown in FIGS. 5A-5B) required for several aspects of the present invention. Network interface 680 provides connectivity to a network (e.g., using Internet Protocol), and may be used to communicate with other connected systems (such as developer systems 110A-110C, server system 160, etc.) of FIG. 1.

Secondary memory 630 may contain hard drive 635, flash memory 636, and removable storage drive 637. Secondary memory 630 may store the data (for example, portions of the rules and templates shown in FIGS. 3A-3B, portions of the design document shown in FIG. 4A, portions of the generated test cases shown in FIGS. 4B-4C, etc.) and software instructions (for example, for performing the steps of FIG. 2), which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of generating test cases for functional testing of a software application, said method comprising:
   maintaining a plurality of rules, each rule specifying a corresponding one of a plurality of patterns in a natural language associated with a corresponding template, wherein each of said plurality of patterns comprises a corresponding set of variables and corresponding words of the natural language together in an ordered sequence, wherein each template indicates a corresponding set of test cases based on the set of variables contained in the pattern associated with the template, each test case being specified in the form of a corresponding set of instructions, each instruction comprising text embedded with at least one of the set of variables contained in the pattern associated with the template;
   receiving a design document containing a plurality of statements, each statement containing words of said natural language;
   determining a first statement of said plurality of statements matching a first pattern specified in a first rule of said plurality of rules, wherein a match is deemed to exist if the words in the first pattern exist in the first statement in the same corresponding positions of said ordered sequence, and if said first statement also contains values for each of said corresponding set of variables specified in said first pattern,
   wherein said first rule specifies that said first pattern is associated with a first template, said first pattern containing a first set of variables, wherein said determining identifies values for each of said first set of variables based on said matching, said first template indicating a first test case containing a first set of instructions embedded with said first set of variables; and
   generating said first test case indicated by said first template specified in said first rule by substituting said first set of variables embedded in said first set of instructions with the corresponding values identified by said determining.

2. The method of claim 1, wherein said first pattern comprises said first set of variables and a first set of words in a first ordered sequence, wherein said first ordered sequence associates a corresponding ordinal position for each of said first set of variables and said first set of words,
   wherein said determining determines that said first statement matches said first pattern if said first statement also contains said first set of word in the same corresponding ordinal positions and if said each of said first set of variables can be matched to corresponding one or more words representing said identified values in the same corresponding ordinal positions.

3. The method of claim 2, wherein said first template specified by said first rule further specifies a set of local variables and corresponding local values in addition to said first set of variables, wherein said generating generates said first test case based on said first set of instructions, the identified values for said first set of variables and the corresponding local values for said set of local variables.

4. The method of claim 3, wherein said first pattern is of the form "$1 A B $2", where $1 and $2 are variables in said first set of variables and A and B are words of said natural language, wherein the positions of $1, A, B and $2 according to said first ordered sequence are 1, 2, 3 and 4 respectively,
   wherein said determining determines that said first statement matches said first pattern if said first statement is one of the forms "C A B E" and "C D A B E", wherein C, D and E are words of said the natural language, since the positions of the words A and B are 2 and 3 as specified in said first pattern with the variable $1 identified as having the respective values "C" and "C D" and the variable $2 identified as having the value "E".

5. The method of claim 4, wherein said determining determines that a second statement of said plurality of statements having one of the forms "C D B A E" and "C A D B E" does not match said first pattern, since the relative positions of the words A and B are 3, 2 and 2, 4 respectively, and not 2, 3 as specified in the pattern.

6. A machine readable non-transitory medium storing one or more sequences of instructions for causing a system to generate test cases for functional testing of a software application, wherein execution of said one or more sequences of instructions by said one or more processors contained in said system causes said system to perform the actions of:
   maintaining a plurality of rules, each rule specifying a corresponding one of a plurality of patterns in a natural language associated with a corresponding template, wherein each of said plurality of patterns comprises a corresponding set of variables and corresponding words of the natural language together in an ordered sequence, wherein each template indicates a corresponding set of test cases based on the set of variables contained in the pattern associated with the template, each test case being specified in the form of a corresponding set of instructions, each instruction comprising text embedded with at least one of the set of variables contained in the pattern associated with the template;

receiving a design document containing a plurality of statements, each statement containing words of said natural language;

determining a first statement of said plurality of statements matching a first pattern specified in a first rule of said plurality of rules, wherein a match is deemed to exist if the words in the first pattern exist in the first statement in the same corresponding positions of said ordered sequence, and if said first statement also contains values for each of said corresponding set of variables specified in said first pattern, wherein said first rule specifies that said first pattern is associated with a first template, said first pattern containing a first set of variables, wherein said determining identifies values for each of said first set of variables based on said matching, said first template indicating a first test case containing a first set of instructions embedded with said first set of variables; and generating said first test case indicated by said first template specified in said first rule by substituting said first set of variables embedded in said first set of instructions with the corresponding values identified by said determining.

7. The machine readable non-transitory medium of claim 6, wherein said first pattern comprises said first set of variables and a first set of words in a first ordered sequence, wherein said first ordered sequence associates a corresponding ordinal position for each of said first set of variables and said first set of words, wherein said determining determines that said first statement matches said first pattern if said first statement also contains said first set of word in the same corresponding ordinal positions and if said each of said first set of variables can be matched to corresponding one or more words representing said values in the same corresponding ordinal positions.

8. The machine readable non-transitory medium of claim 7, wherein said first template specified by said first rule further specifies a set of local variables and corresponding local values in addition to said first set of variables, wherein said generating generates said first test case based on said first set of instructions, the identified values for said first set of variables and the corresponding local values for said set of local variables.

9. The machine readable non-transitory medium of claim 8, wherein said first pattern is of the form "$1 A B $2", where $1 and $2 are variables in said first set of variables and A and B are words of said natural language, wherein the positions of $1, A, B and $2 according to said first ordered sequence are 1, 2, 3 and 4 respectively, wherein said determining determines that said first statement matches said first pattern if said first statement is one of the forms "C A B E" and "C D A B E", wherein C, D and E are words of said the natural language, since the positions of the words A and B are 2 and 3 as specified in said first pattern with the variable $1 identified as having the respective values "C" and "C D" and the variable $2 identified as having the value "E".

10. The machine readable non-transitory medium of claim 9, wherein said determining determines that a second statement of said plurality of statements having one of the forms "C D B A E" and "C A D B E" does not match said first pattern, since the relative positions of the words A and B are 3, 2 and 2, 4 respectively, and not 2, 3 as specified in the pattern.

11. A digital processing system comprising:
a processor;
a random access memory (RAM);
a machine readable medium to store one or more instructions, which when retrieved into said RAM and executed by said processor causes said digital processing system to generate test cases for functional testing of a software application, said digital processing system performing the actions of:

maintaining a plurality of rules, each rule specifying a corresponding one of a plurality of patterns in a natural language associated with a corresponding template, wherein each of said plurality of patterns comprises a corresponding set of variables and corresponding words of the natural language together in an ordered sequence, wherein each template indicates a corresponding set of test cases based on the set of variables contained in the pattern associated with the template, each test case being specified in the form of a corresponding set of instructions, each instruction comprising text embedded with at least one of the set of variables contained in the pattern associated with the template;

receiving a design document containing a plurality of statements, each statement containing words of said natural language;

determining a first statement of said plurality of statements matching a first pattern specified in a first rule of said plurality of rules, wherein a match is deemed to exist if the words in the first pattern exist in the first statement in the same corresponding positions of said ordered sequence, and if said first statement also contains values for each of said corresponding set of variables specified in said first pattern, wherein said first rule specifies that said first pattern is associated with a first template, said first pattern containing a first set of variables, wherein said determining identifies values for each of said first set of variables based on said matching, said first template indicating a first test case containing a first set of instructions embedded with said first set of variables; and generating said first test case indicated by said first template specified in said first rule by substituting said first set of variables embedded in said first set of instructions with the corresponding values identified by said determining.

12. The digital processing system of claim 11, wherein said first pattern comprises said first set of variables and a first set of words in a first ordered sequence, wherein said first ordered sequence associates a corresponding ordinal position for each of said first set of variables and said first set of words, wherein said determining determines that said first statement matches said first pattern if said first statement also contains said first set of word in the same corresponding ordinal positions and if said each of said first set of variables can be matched to corresponding one or more words representing said values in the same corresponding ordinal positions.

13. The digital processing system of claim 12, wherein said first template specified by said first rule further specifies a set of local variables and corresponding local values in addition to said first set of variables, wherein said generating generates said first test case based on said first set of instructions, the identified values for said first set of variables and the corresponding local values for said set of local variables.

14. The digital processing system of claim 13, wherein said first pattern is of the form "$1 A B $2", where $1 and $2 are variables in said first set of variables and A and B are words of said natural language, wherein the positions of $1, A, B and $2 according to said first ordered sequence are 1, 2, 3 and 4 respectively,     wherein said determining determines that said first statement matches said first pattern if said first statement is one of the forms "C A B E" and "C D A B E", wherein C, D and E are words of said the natural language, since the positions of the words A and B are 2 and 3 as specified in said first pattern with the variable $1 identified as having the respective values "C" and "C D" and the variable $2 identified as having the value "E".

15. The digital processing system of claim 14, wherein said determining determines that a second statement of said plurality of statements having one of the forms "C D B A E" and "C A D B E" does not match said first pattern, since the relative positions of the words A and B are 3, 2 and 2, 4 respectively, and not 2, 3 as specified in the pattern.

\* \* \* \* \*